(12) United States Patent
Pearman et al.

(10) Patent No.: US 6,217,441 B1
(45) Date of Patent: Apr. 17, 2001

(54) METHOD AND APPARATUS FOR SEALING BUILDING DUCTWORK DURING CHEMICAL OR BIOLOGICAL ATTACK

(75) Inventors: A. Noel J. Pearman, St. Paul; John D. Howard, III, Mendota Heights; Thomas B. Cunningham, New Brighton, all of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/281,738

(22) Filed: Mar. 30, 1999

(51) Int. Cl.$^7$ .................................................. F24F 13/10
(52) U.S. Cl. ...................... 454/333; 251/61.1; 454/256; 454/902
(58) Field of Search .................................. 454/322, 333, 454/239, 256, 257, 170, 171, 172, 902; 251/61.1

(56) References Cited

U.S. PATENT DOCUMENTS

| | | | |
|---|---|---|---|
| 2,598,207 | * 5/1952 | Bailey et al. | 454/333 X |
| 3,592,207 | * 7/1971 | Borello . | |
| 3,715,131 | 2/1973 | Hurley et al. | 280/150 AB |
| 3,741,585 | 6/1973 | Hendrickson et al. | 280/150 AB |
| 3,904,221 | 9/1975 | Shiki et al. | 280/150 AB |
| 3,985,076 | 10/1976 | Schneiter et al. | 102/39 |
| 4,005,876 | 2/1977 | Jorgensen et al. | 280/741 |
| 4,294,420 | * 10/1981 | Broquet . | |
| 4,315,361 | 2/1982 | Brooks | 29/432.1 |
| 4,519,177 | 5/1985 | Russell | 52/745 |
| 4,522,116 | 6/1985 | Tartaglino . | |
| 4,662,269 | 5/1987 | Tartaglino | 454/333 X |
| 4,742,956 | * 5/1988 | Zelczer . | |
| 4,783,045 | * 11/1988 | Tartaglino | 251/61.1 |
| 4,817,828 | 4/1989 | Goetz | 222/3 |
| 5,234,374 | 8/1993 | Hyzyk et al. | 454/322 |
| 5,253,901 | 10/1993 | Hunter | 285/424 |
| 5,348,270 | * 9/1994 | Dinh | 251/61.1 |
| 5,370,147 | * 12/1994 | Brusse et al. | 251/61.1 |
| 5,399,121 | 3/1995 | Gray et al. | 454/137 |
| 5,449,112 | * 9/1995 | Heitman et al. . | |
| 5,660,212 | 8/1997 | Elder | 138/157 |
| 5,906,238 | * 5/1999 | Carmody et al. . | |

FOREIGN PATENT DOCUMENTS 27 43 107 * 4/1979 (DE) ................................... 454/256

* cited by examiner

Primary Examiner—Harold Joyce
(74) Attorney, Agent, or Firm—John G. Shudy, Jr.

(57) ABSTRACT

A system for sealing a building air duct in response to a chemical or biological attack to prevent the building HVAC system from delivering the chemical or biological agent throughout the building. The system can include an inflatable bladder for disposition within an air duct, a source of gas for expanding the bladder, an initiator for initiating the gas expansion, and a detector for detecting the agent. One bladder is formed of a resilient material suitable for extending into duct corners. Another bladder is larger than the duct to be sealed and is formed of a non-resilient material capable of inflating and bunching into duct corners. One source of gas is a gas canister while another source of gas is a chemical composition capable of reacting and forming the gas. One bladder includes a foaming agent which can expand and solidify within the bladder. One initiator utilizes an electronic signal to initiate the gas expansion. Another initiator includes use of an RF signal to initiate the gas expansion. One agent detector samples duct air while another detector includes a horizon detector for detecting agents in the air outside the building.

30 Claims, 6 Drawing Sheets

METHOD AND APPARATUS FOR SEALING BUILDING DUCTWORK DURING CHEMICAL OR BIOLOGICAL ATTACK

FIELD OF THE INVENTION

The present invention is generally related to building heating, ventilating, and air conditioning. Specifically, the present invention is related to inflatable bladders for tightly sealing ducts in response to chemical or biological attack. In particular, the present invention includes portable, rapidly expandable bags suitable for quick placement in large air ducts of public buildings.

BACKGROUND OF THE INVENTION

The recent demise of the cold war and decline in super-power tensions has been accompanied by an increase in concern over the viability of weapons of mass destruction such as chemical and biological (CB) weapons. CB weapons include chemical agents such as phosgene, nerve agents such as Sarin, and biological agents such as anthrax or small pox. CB weapons may be delivered to occupants within a building by releasing the agents external to the building but close to an air intake of the building. The air intake may be located near the ground or near the roof or somewhere in between, depending on the building architecture. Agents may also be released within a public area of a building, and be dispersed to other, private areas of the same building. Agents released in one area of a building may be further dispersed by the heating, ventilating, and air conditioning (HVAC) system of the building. It is possible that building air may be removed from the room of release and dispersed by the HVAC system itself through the building. If building air is recycled by mixing return air with intake air, as is sometimes the case, either intentionally or inadvertently, then the HVAC system may effectively deliver an agent from one room to the entire building.

Agents may be delivered in vehicles giving some warnings as to the delivery, such as missiles. Agents may be delivered in vehicles giving no warning, such as a pedestrian held putative asthma inhaler activated near an air intake.

Certain buildings, such as key military sites, can be equipped or designed well in advance to deal with the use of CB weapons. Other buildings, however, such as hotels that are hosting dignitaries or a head of state may be more susceptible to a CB weapons attack. What would be desirable therefore, is a system for sealing air ducts of a building that can be placed and activated on short notice.

SUMMARY OF THE INVENTION

The present invention includes a system for sealing an air duct of a building including an inflatable bladder coupled to means for initiating inflation. A harmful agent detector such as a chemical or biological detector (CBD) can be used in a manual mode to activate an alarm and rely on a human to initiate duct sealing or can be used in conjunction with a controller system in an automatic mode to automatically initiate duct sealing. In one embodiment, the bladder includes a rapidly reacting chemical composition that rapidly creates a volume of gas sufficient to inflate the gas bag.

One class of expandable bladders includes envelopes formed of non-resilient material that does not stretch an appreciable amount under pressure. The non-resilient bags are preferably oversized relative to the duct in which they are to be placed. The oversized bladders have sufficient surface area to extend into the duct corners and seal the ducts. Another class of expandable bladders includes envelopes formed of resilient material, which stretches under pressure. The resilient or elastic envelopes can stretch into the corners of, for example, rectangular air ducts to seal the corners.

Some expandable bladders are positioned along one internal wall of a duct. Other expandable bladders are pre-positioned between two corners of a rectangular duct and can be paired with another bladder or bladder portion disposed between two different corners of an opposing internal wall. Pre-positioned bladders can be held in place using mechanical, magnetic, or any other means. Pre-positioning bladders in duct internal corners can provide corner and wall sealing at the outset, leaving the duct interior to seal upon inflation.

It is contemplated that the duct may be reinforced when an expanding gas filled envelope might compromise duct integrity. Ducts may be reinforced internally with internal sleeves or externally with frame members disposed around the duct exterior. Ducts may also be reinforced by using external frame members held in place by internally disposed cross-members extending through the duct interior.

A preferred source of expansion gas includes chemical compositions that generate large amounts of gas when a reaction is initiated, often by an electrical spark or rapidly heated wire. Gas may be supplemented or even supplanted by use of an expanding foaming agent. The foaming agent can be used in part to force an envelope into duct corners to insure corner sealing. The foaming agent can be used to make the envelope's expansion permanent, insuring that the duct will remain sealed even if the gas leaks from the envelope. The foam is preferably rapidly expanding and hardening, and can be similar to foams used for in-place foam packing applications and home and building insulation applications.

In use, a building can be protected by selecting proper ducts and disposing expandable gas bladders within the ducts. Wiring can be extended to the outside of the duct, and may terminate locally through wires to a receiver which can be connected to an antenna. Chemical or biological detectors can be installed in select locations, including locations within ducts and within public areas of the building, and also can be located external to the building. Horizon detectors can be installed external to the building. The detectors can be either hardwired or linked with RF signals to a controller. The controller can either be run in manual mode, requiring a human to initiate envelope inflation, or can be run in automatic mode, using the controller to initiate envelope inflation.

DETAILED DESCRIPTION OF THE INVENTION

Figure 1:
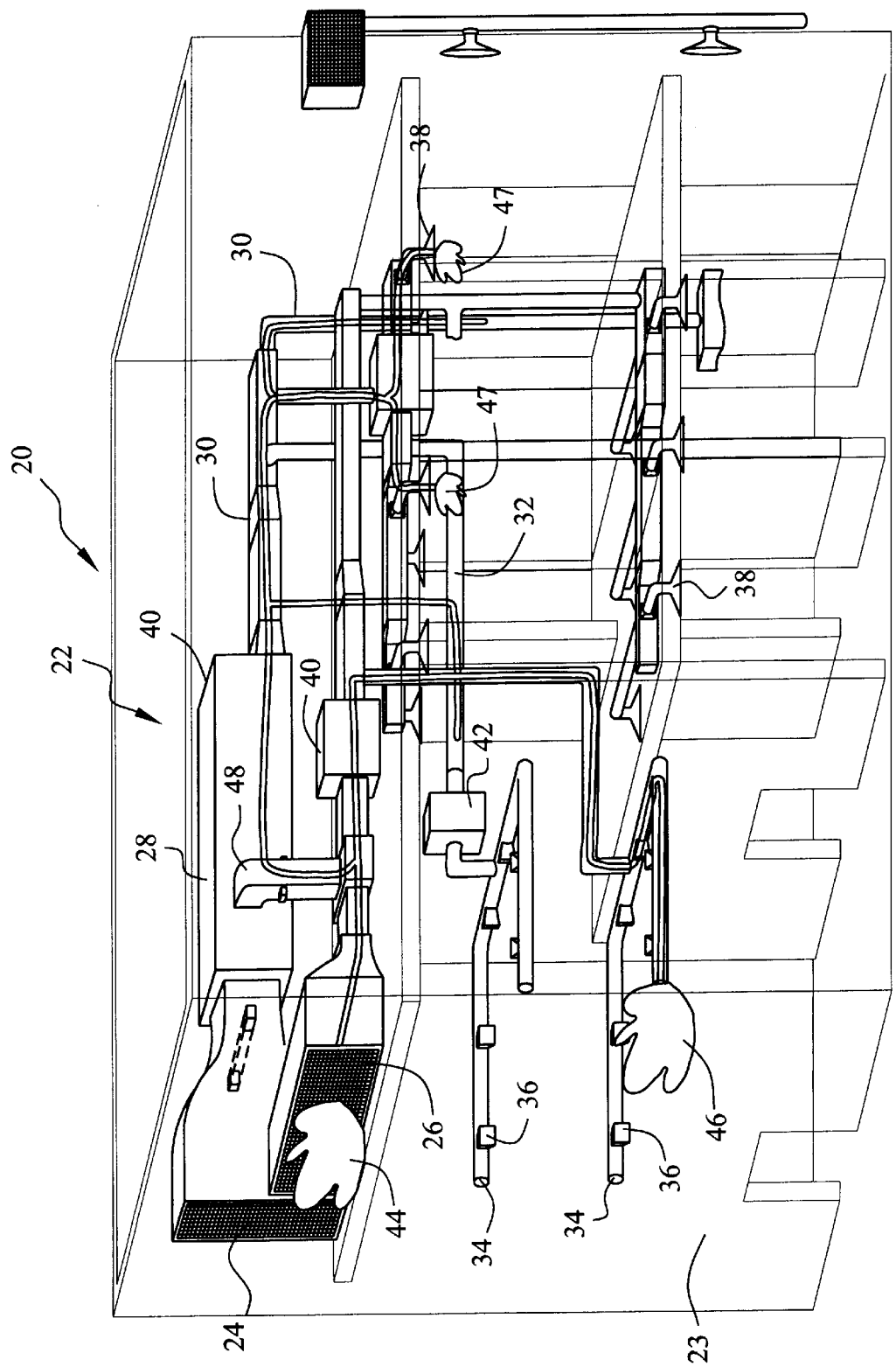
FIG. 1 is a highly diagrammatic, perspective, cutaway view of a conventional building HVAC system shown delivering a harmful agent from a public area return air duct to private areas in the building interior.

FIG. 1 illustrates a building 20 including a public atrium area 23 and having a conventional building heating, ventilating, and air conditioning (HVAC) system 22 not having any duct isolation equipment in place. HVAC system 22 includes an outside air intake 24 and an outside air exhaust 26. Air intake 24 and exhaust 26 are connected to a series of ducts including large, usually rectangular chambers or ducts such as chamber 28, and intermediate sized, usually rectangular, ducts 30. Intermediate ducts 30 split off into a series of smaller, often circular, ducts 32, which feed a series of room diffusers 38. Return air vents 36 and return air ducts 34 return air either to be expelled outside the building or be mixed with fresh air intake. Heating, cooling, humidification, and dehumidification functions are often performed in large chambers such as chamber 28, and in more local intermediate sized chambers 42. Mixing and/or recirculation can be performed by a return air duct 48.

FIG. 1 illustrates an internally released harmful agent cloud 46 dispersed in public atrium 23 near return air vents 36. HVAC system 22 is illustrated transporting harmful agent 46 through return air ducts 34, through return air duct 48, into intake chamber 28, and dispersing it as externally released cloud 44 and internally released harmful agent cloud 47 through diffusers 38. As illustrated, the harmful agent is delivered from a public portion of the building to the private areas of the building by the HVAC system and to the exterior near the building as well.

Figure 2:
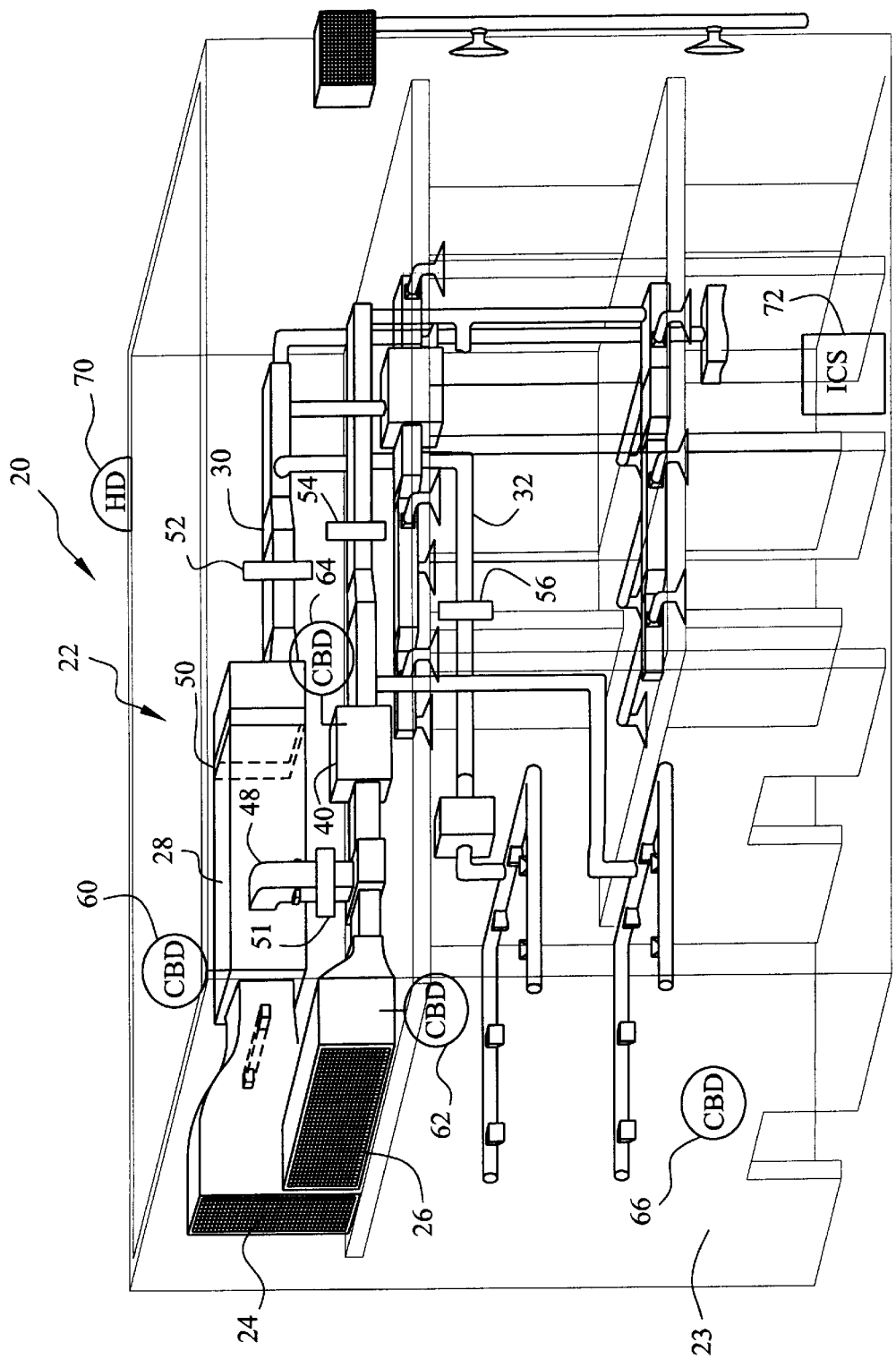
FIG. 2 is a highly diagrammatic, perspective, cutaway view of the building HVAC system of FIG. 1 having local harmful agent detectors, a horizon detector, and duct isolation devices.

Referring now to FIG. 2, building 20 and HVAC system 22 have been outfitted with harmful agent detectors or chemical-biological detectors (CBDs) and a ductwork isolation system. In the example illustrated, a CBD 60 is disposed in large chamber 28, a CBD 62 is disposed near air exhaust 26, a CBD 64 is disposed in intermediate chamber 40, and a room air CBD 66 is disposed in public atrium 23.

A horizon CBD 70 can be disposed external to the building, such as on the roof Horizon CBD 70 can detect more distant harmful agents using spectroscopic techniques including those incorporating LIDAR and laser technologies. Horizon CBDs can be useful for detecting harmful agents released a distance from the building, such as those delivered by missile. In the embodiment illustrated, the CBDs are in communication with an Isolation Control System (ICS) 72, preferably using wires (omitted to simplify the drawing).

Disposed within the ducts are a series of duct isolation devices such as inflatable bladders. A duct isolation device 50 is disposed within large duct 28, duct isolation devices 52 and 54 are disposed within the intermediate sized ducts, and another duct isolation device 56 is disposed within a small, local circular duct. Another duct isolation device 51 is disposed within return air duct 48. The duct isolation devices are preferably in communication with central Isolation Control System 72 using hard wiring. In some embodiments, radio frequency links are used to link detectors, controllers, and duct isolation devices. In other embodiments, the detector and controller are disposed in close proximity to the duct isolation device.

Figure 3:
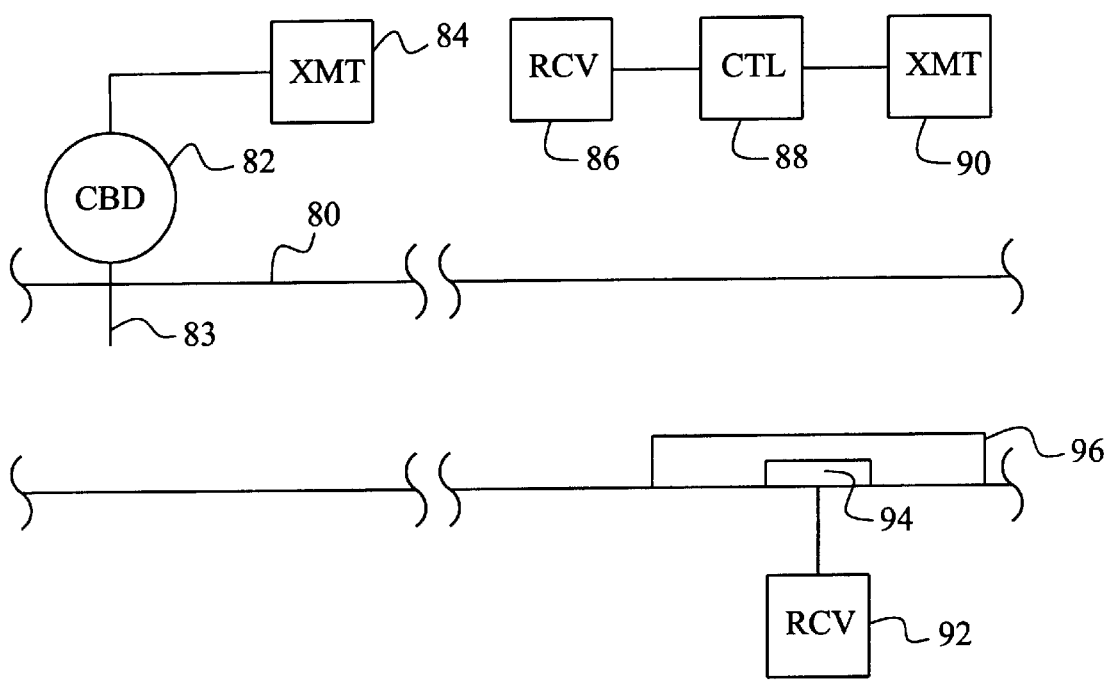
FIG. 3 is a schematic view of a system for sealing an air duct including a harmful agent detector, a controller, an initiator and an inflatable bladder disposed inside a duct.

Referring now to FIG. 3, a control system for duct isolation is further illustrated. A duct 80 is shown having a CBD 82 mounted external to the duct and a probe 83 extending into the duct. CBD 82 is linked to a transmitter 84, which is in communication with a receiver 86, which is coupled to the input of a controller 88. The output of controller 88 is coupled to a transmitter 90 which is in communication with a receiver 92 disposed near a duct isolation device 96. Duct isolation device 96 includes an inflator 94 coupled to receiver 92. In use, when CBD 82 detects a harmful agent, the system can be run in automatic mode, using controller 88 to trigger inflator 94 automatically. The system can also be run in manual mode, with controller 88 using an annunciator to signal a human operator who is required to operate controller 88 to signal inflator 94.

Figure 4:
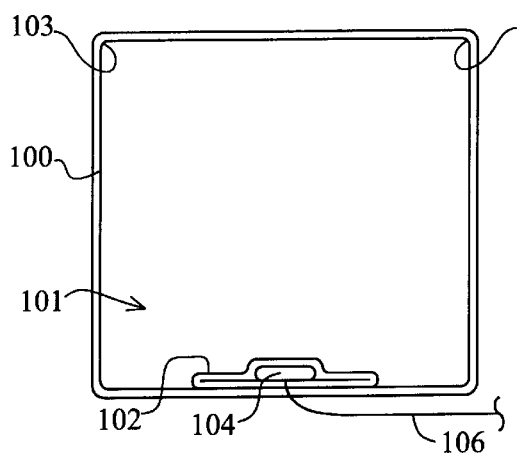
FIG. 4 is a transverse, cross-sectional view of an uninflated, oversized bladder disposed within an air duct.

Referring now to FIG. 4, a duct 100 having corners 103 is illustrated having an un-inflated duct isolation device 101 including a communication wire 106, an inflator 104, and an inflatable bladder 102. Inflatable bladder 102 is shown disposed on the bottom of duct 100. In some embodiments, duct isolation device 101 can be totally disposed within an air duct, including the CBD for triggering the device. In other embodiments, only an antenna for receiving RF triggering signals extends external to the commonly metallic duct walls. In still other embodiments, a wire such as wire 106 runs to a receiver or controller external to the duct.

Figure 5:
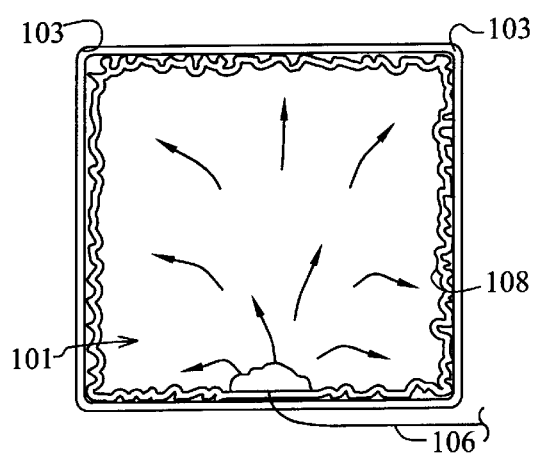
FIG. 5 is a transverse, cross-sectional view of the bladder of FIG. 4 in an inflated state.

Referring now to FIG. 5, duct isolation device 101 is illustrated in an inflated state. Duct isolation device 101 has an envelope 108 pressing against the internal duct wall surfaces. In the embodiment illustrated, envelope 108 is oversized relative to duct 100. This results in a plurality of small folds of material pressing against the internal duct walls. Taken over a short longitudinal distance, the small folds can allow air passage between the folds. Taken over a moderate or long distance, the folds terminate and other folds begin, at random, thus precluding air passage any appreciable distance. One reason for using over sized inflatable envelopes is to insure that corners 103 are filled with envelope material. In particular, the use of round envelopes may be undersized with respect to the corners. In some embodiments, the envelope includes external ribs at regular intervals, extending about partially or totally around the envelope's circumference. The ribs can act to interrupt any airflow through the folds, where the folds are pressing against the flat duct sides away from the corners. In some embodiments, resilient envelope material is used to allow the envelope to expand elastically under pressure into corners 103. In still other embodiments, the envelope surfaces are coated with an extremely sticky material which can secure the envelope outer surface to the duct internal surface immediately after expansion of the envelope against the duct walls.

Figure 6:
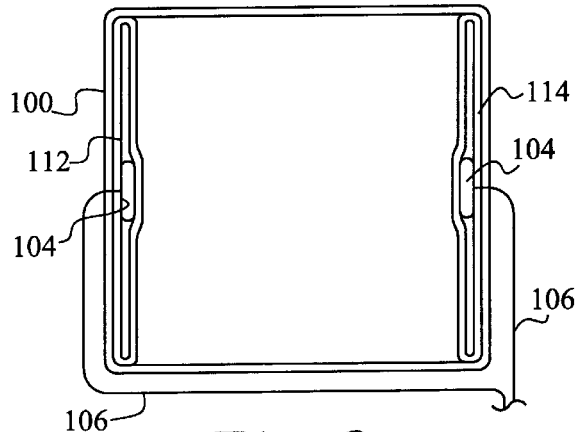
FIG. 6 is a transverse, cross-sectional view of an un-inflated bladder having a first portion and a second portion, secured to the duct internal walls.

Referring now to FIG. 6, duct 100 is illustrated having a duct isolation device or bladder including a first part 112 installed along one internal wall of duct 100. First part 112 is substantially rectangular in the embodiment illustrated, and extends to two corners of the duct. In some embodiments, the un-inflated bladder is secured to the duct interior wall using mechanical fasteners inserted through the duct walls. In other embodiments, the un-inflated bladder is secured using magnetic material, preferably covering a large amount of duct internal surface area. By using a pre-installed inflatable portion extending from one corner to a second corner, two corners can be covered prior to inflation. Upon inflation, the inflatable device can inflate across the rectangular duct and seal the opposite two corners as well, along with blocking the intervening duct interior. In one embodiment, the corner-to-corner inflatable envelope is sized to match the dimension of the duct wall upon which it will be installed. In another embodiment, more suitable for quick installation, the corner-to-corner inflatable envelope is sized larger than the wall upon which it is installed, with the excess material allowed to bulge out either in the middle of the wall, or to wrap around the corners onto the adjacent perpendicular walls. In the embodiment illustrated in FIG. 6, a second inflatable device 114 is secured to the internal duct wall opposite first inflatable device 112. Device 114 illustrates one device for sealing the other two corners of a rectangular duct. Inflators 104 and wires 106 are illustrated being coupled to devices 112 and 114.

Figure 7:
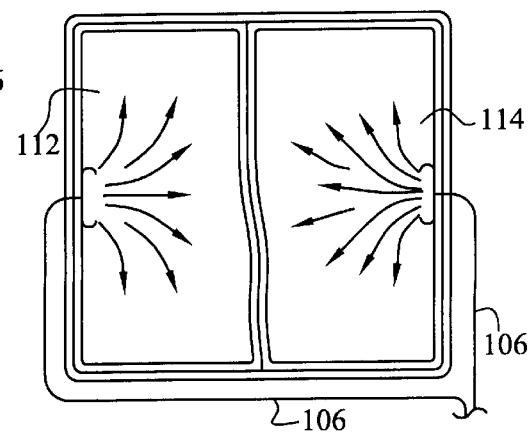
FIG. 7 is a transverse, cross-sectional view of the bladder of FIG. 6 in an inflated state.

Referring now to FIG. 7, inflatable devices 112 and 114 are illustrated in an inflated state, meeting along a common boundary 116. FIG. 7 further illustrates a method for sealing the difficult to seal corners using two opposed inflatable devices, which may more easily seal along common boundary 116.

Figure 8:
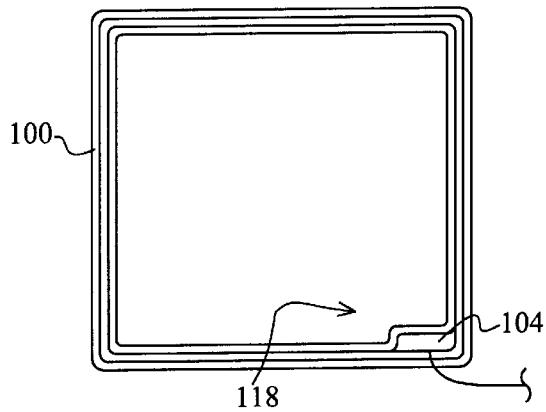
FIG. 8 is a transverse, cross-sectional view of a bladder device installed around all duct inner walls.
Figure 9:
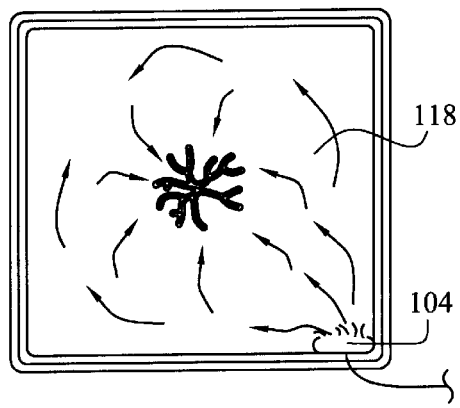
FIG. 9 is a transverse, cross-sectional view of the bladder device of FIG. 8 in an inflated state.
Figure 10:
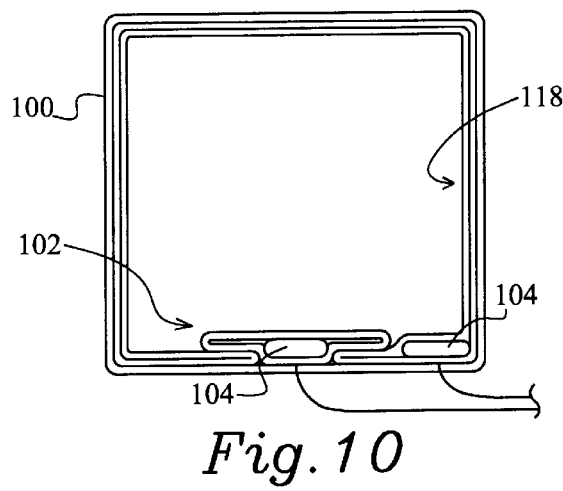
FIG. 10 is a transverse, cross-sectional view of a bladder device having a first portion installed around all duct inner walls and a second portion disposed along one duct inner wall.
Figure 11:
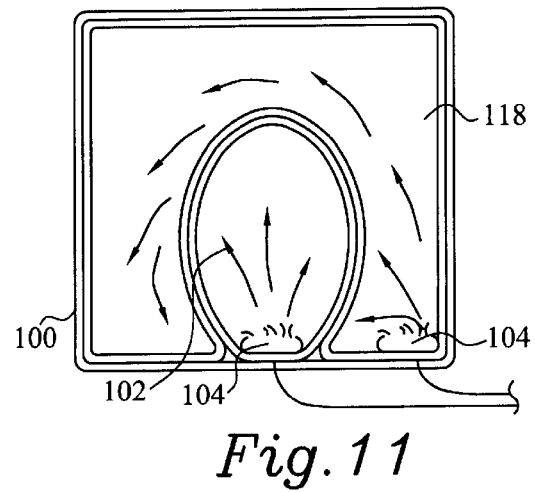
FIG. 11 is a transverse, cross-sectional view of the bladder device of FIG. 10 showing both bladder portions in an inflated state.

Referring now to FIG. 8, another inflatable device 118 is illustrated, installed so as to cover all interior surfaces of the duct, while presenting only a small profile to obstruct airflow. Inflatable device 118 can be used in one of two ways. Device 118 can be fully inflated to totally occlude duct 100. Fully inflated device 118 is illustrated in FIG. 9. The inflatable bladder comes together at the center to totally occlude duct 100. Device 118 can be used in a second way, illustrated by FIGS. 10 and 11, as a corner sealing aid used in conjunction with second inflatable device 102 illustrated in FIG. 4. Used in this way, device 118 can be inflated as illustrated in FIG. 11, to present a non-perpendicular corner to be sealed by second device 102. Used in this way, device 118 need only be partially inflated, as illustrated by FIG. 11. Device 102 can be inflated in conjunction with device 118 to totally occlude duct 100. Device 118 can be precisely sized to fit the duct or can be oversized, with ends overlapping within the duct. In some embodiments, device 118 has one edge cut to length and sealed or crimped at the point of installation.

Figure 12:
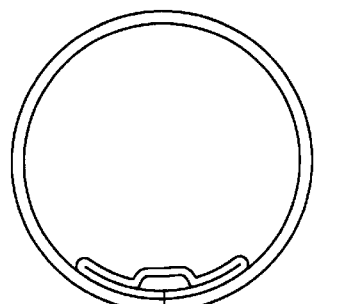
FIG. 12 is a transverse, cross-sectional view of a bladder device installed in a circular air duct.

Referring now to FIG. 12, a circular duct 120 is illustrated having an expandable device 122 including inflator 104 and wires 106. FIG. 12 illustrates a device suitable for installation in circular ducts, which present no corner-sealing problem to be dealt with. Device 122 can be used for sealing circular, local ducts feeding a small number of rooms.

Figure 13:
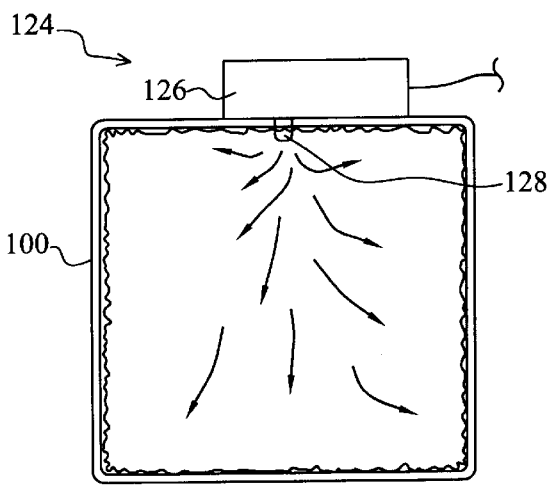
FIG. 13 is a highly diagrammatic, transverse cross-sectional view of a foaming device installed external to an air duct.

Referring now to FIG. 13, another device for sealing ducts is illustrated in foaming device 124, including a foam generator 126 and nipple 128 extending into duct 100. Foaming device 124 uses a rapidly-expanding and rapidly-hardening foam to seal duct 100. Rapidly expanding and hardening foams are well known to those skilled in the art. Polyurethane or phenolic foams are believed suitable for the present invention. Foaming device 124 presents another device used to seal duct corners and to seal the center of the duct as well. In a preferred embodiment, air-handling equipment such as fans are turned off prior to triggering foam generator 128. Foam generators can also be used in conjunction with inflatable envelopes, discussed below.

The use of rapidly expandable envelopes, in particular those using variants of automobile air bag technology, may cause some deformation or damage to ducts, especially if not sized properly. To lessen or eliminate this problem, ducts may be reinforced close to where the inflatable devices are deployed. In particular, the duct wall may be reinforced either internally or externally, to maintain the integrity of the duct walls.

Figure 14:
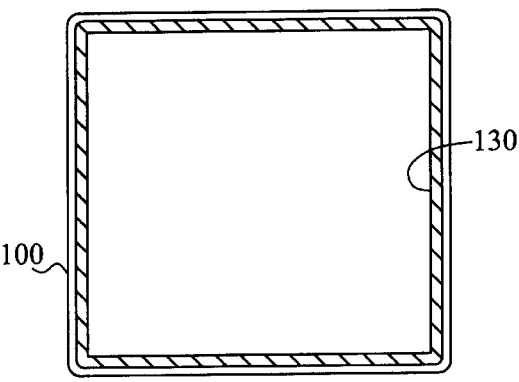
FIG. 14 is a transverse, cross-sectional view of an internal duct-reinforcing device.

Referring now to FIG. 14, duct 100 is illustrated having an internal, rectangular duct reinforcement liner 130 installed within duct 100. Liner 130 is preferably formed of metal such as heavy gauge sheet metal and can be sized to fit a particular duct. Liner 130 is preferably at least as long as the expected length of the inflated envelope, nominally at least two feet long. A liner such as liner 130 may require too much time to install for some applications.

Figure 15:
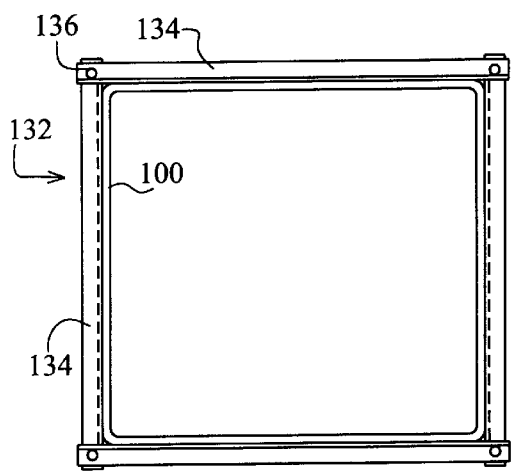
FIG. 15 is a transverse, cross-sectional view of an external duct-reinforcing device.

Referring now to FIG. 15, an external reinforcing frame 132 is illustrated, having frame members 134 joined externally at corners 136. Reinforcing frame 132 can be rapidly installed. Frame members 134 need not be sized exactly to the size of duct 100, as they can be oversized, extending past corners 136. Multiple external frames 132 can be installed over the length of the duct near the location of the duct-sealing device. In some locations however, the duct may not be accessible around all four sides and four corners.

Figure 16:
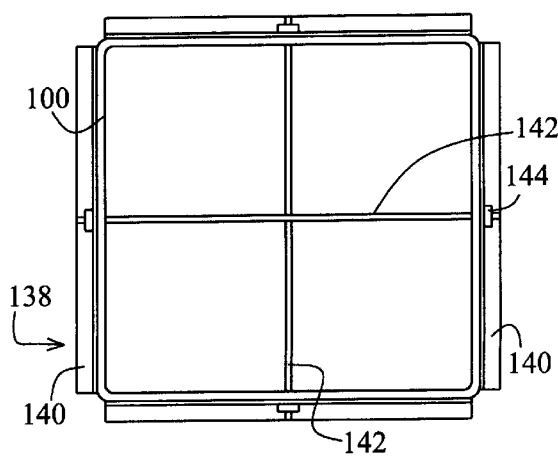
FIG. 16 is a transverse, cross-sectional view of an external duct-reinforcing device using internally disposed cross members.

Referring now to FIG. 16, an external reinforcing frame 138 is illustrated, having external frame members 140 held to duct 100 by internal cross members 142 extending through duct 100 and held to frame members 140 by nuts 144 threaded onto a threaded portion of cross members 142. FIG. 14 illustrates two pairs of external frame members, which need not be located exactly opposite each other. External reinforcing frame 138 may be suitable where the entire duct cannot be enclosed, but where opposing duct surfaces can be accessed. Other methods and devices for reinforcing ducts are 1presented in U.S. Pat. No. 4,315,361 to Brooks, U.S. Pat. No. 4,519,177 to Russell, U.S. Pat. No. 5,253,901 to Hunter, and U.S. Pat. No. 5,660,212 to Elder, hereby incorporated by reference.

Various methods for expanding inflatable devices are suitable for use with the present invention. One class of inflators includes compressed gas sources such as air cylinders. The compressed gas sources may be relatively bulky and too slow to respond for some applications. Another class of inflators includes chemical compositions that react to generate gas, such as those used in automobile air bags. Such inflators are rapid, relatively compact, and relatively stable when properly handled. Gas generating compositions and devices are well known to those skilled in the art. See, for example, U.S. Pat. No. 3,715,131 to Hurley et al., U.S. Pat. No. 3,741,585 to Hendrickson et al., U.S. Pat. No. 3,904,221 to Shiki et al, and U.S. Pat. No. 4,005,876 to Jorgensen et al., hereby incorporated by reference.

While inflators using gas can be rapidly acting, it may sometimes be desirable to seal an inflatable envelope and duct with something even longer lasting. In such cases, the use of expandable, hardening foam may be desirable, as discussed above. In general, the foam may be less rapidly expanding than an inflator such as those used in automobile air bag technology. If the slower speed is acceptable, then foam, itself, may be used as the expansion media. If the slower speed is not acceptable, then a rapidly expanding gas may be used to expand the envelope against the duct walls, followed by an expanding foam material within the envelope. The rapidly expanding gas filled envelope will occlude the duct and the hardening foam will make the occlusion more permanent. Foamed plastics and foaming or foam blowing agents, well known to those skilled in the polymer art, are often used in foam-in-place packing applications. Polyurethane foams and phenolic foams are believed suitable for duct sealing applications.

In use, the duct isolation devices can be installed with varying degrees of speed, coverage, and permanence. Ducts of all sizes can be rapidly protected using the devices previously described. Devices as illustrated in FIG. 4, for example, can be set within a duct and a wire or antenna may be extended inside or outside of the duct. The device can be bolted to existing structure within the duct or bolted to newly formed holes through the duct wall. The wire or antenna can be extended through a newly drilled hole in the duct wall or through existing conduit commonly found in large ducts. A CBD can be installed where desired in the building. An RF triggering device can be installed where desired. For example, if an important meeting is to be held in a public building, an inflatable device can be disposed in a duct with an antenna extending from the duct. An RF triggering device can be manually or automatically tripped when a harmful agent is detected by any means.

The various duct isolation devices can likewise be rapidly installed in a variety of duct sizes and shapes. Some duct reinforcing structures, in particular those of FIGS. 15 and 16, can be quickly installed to persevere the integrity of the duct, if the nature of the duct and duct isolation device makes maintaining duct integrity an issue.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The inventions's scope is, of course, defined in the language in which the appended claims are expressed.

What is claimed is:

1. A system for restricting or preventing flow of fluid through a duct, said system comprising:
    at least two inflatable bladders positioned within said duct, said at least two inflatable bladders configured to engage each other upon inflation; and
    means for inflating said at least two inflatable bladders to restrict or prevent said flow of said fluid through said duct, said means for inflating includes a foaming agent.

2. A system as recited in claim 1, wherein said air duct has internal walls and said means for inflating said at least two inflatable bladders includes a chemical composition capable of generating quantities of gas to inflate said at least two inflatable bladders.

3. A system as recited in claim 1, further comprising means for detecting a chemical-biological agent, said means for inflating is activated by said means for detecting.

4. A system as recited in claim 3, wherein said means for detecting said chemical-biological agent includes a sensor disposed near said duct for sampling air in or around said duct.

5. A system as recited in claim 1, further comprising an initiator for initiating said means for inflation.

6. A system as recited in claim 5, wherein said initiator includes a human activated switch.

7. A system as recited in claim 1, wherein said means for inflating inflates a first bladder of said at least two inflatable bladders independently of a second bladder of said at least two inflatable bladders.

8. A system as recited in claim 5, further comprising a detector for detecting an airborne agent harmful to human life, wherein said initiator is responsive to a signal provided from said detector when said detector detects said airborne agent.

9. A system as recited in claim 1, wherein said foaming agent expands and hardens.

10. A method for sealing a building air duct in response to the presence of an agent harmful to human life comprising the steps of:
    providing a duct isolation system including a harmful agent detector, at least two inflatable bladders which engage each other upon inflation, an inflator for independently inflating said at least two inflatable bladders, and an initiator for initiating inflation of said at least two inflatable bladders;
    installing said at least two inflatable bladders in said building air duct;
    detecting said agent with said detector;
    initiating said inflation of said at least two inflatable bladders using said initiator when said detector detects a harmful agent; and
    independently inflating said at least two inflatable bladders with said inflator to seal said air duct.

11. A method for sealing a building air duct as recited in claim 10, wherein said initiator is in communication with an air mover that moves air through said building air duct, wherein said initiating further turns said air mover off in response to detecting said agent.

12. A method for sealing a building air duct as recited in claim 10, wherein said initiating is performed automatically in response to said detecting.

13. A method for sealing a building air duct as recited in claim 10, wherein said initiating is performed manually in response to said detecting.

14. A method for sealing a building air duct as recited in claim 10, further comprising reinforcing said duct prior to said initiating step.

15. An inflatable bladder for internally sealing a duct comprising:
    an envelope having an interior;
    means for providing a foam into said interior of said envelope; and
    an initiator for initiating said means for providing said foam.

16. An inflatable bladder as recited in claim 15, wherein said initiator is responsive to an electronic signal.

17. An inflatable bladder as recited in claim 15, wherein said foam expands and hardens in said interior of said envelope.

18. An inflatable bladder as recited in claim 15, wherein said envelope includes means for securing said envelope to at least part of one interior duct wall of said duct prior to initiation.

19. An inflatable bladder as recited in claim 18, wherein said means for securing said envelope to said at least one interior duct wall includes a magnetic material.

20. An inflatable bladder as recited in claim 15, wherein said bladder includes at least two parts, each of said two parts being suitable for securing to a duct wall.

21. An inflatable bladder as recited in clam 15, wherein said envelope is formed of a resilient material.

22. A system for preventing airborne transmission through an air duct when inflated of an agent harmful to human life, said system comprising:

means for detecting said agent;

a self-contained portable bladder system including a bladder for occluding said air duct and inflator for inflating said bladder; and means for initiating inflation of said bladder by said inflator in response to said means for detecting said agent, said means for initiating inflation including a self-contained compressed gas or foam source.

23. The system recited in claim 22, wherein said means for initiating inflation provides an RF signal to said inflator in response to said means for detecting said agent.

24. The system recited in claim 22, wherein said self-contained portable bladder system further comprises a magnetic material to attach said portable bladder system to an interior wall of said air duct.

25. A system for preventing transmission through a duct of an agent harmful to human life, said system comprising:

an inflatable bladder having an interior;

means for detecting said agent harmful to human life;

means for initiating inflation of said inflatable bladder; and means for inflating said inflatable bladder responsive to said means for initiating said inflation, said means for inflating capable of providing a foam into said interior of said inflatable bladder.

26. A method for preventing the transmission of a harmful agent through the duct of a building to at least a portion of a building, comprising:

identifying the ducts that provide ventilation to the portion of the building to be protected;

inserting a portable self-contained inflatable bladder system into the identified ducts; and inflating the inflatable bladder system upon detection of a harmful agent.

27. A system for restricting or preventing flow of fluid through a duct, said system comprising:

at least two inflatable bladders positioned within said duct, said at least two inflatable bladders configured to engage each other upon inflation, and wherein said at least two inflatable bladders includes means for securing said at least two inflatable bladders to selected internal walls of said duct;

said at least two inflatable bladders including a first inflatable bladder and a second inflatable bladder, wherein said first inflatable bladder includes a first part for securing to a first internal wall of said duct and said second inflatable bladder includes a second part for securing to a second internal wall of said duct opposite of said first internal wall; and means for inflating said at least two inflatable bladders to restrict or prevent said flow of said fluid through said duct.

28. A system as recited in claim 27, wherein said means for securing includes a magnetic material.

29. A system as recited in claim 27, wherein each of said at least two inflatable bladders is coated with an adhesive to aid adhesion of said at least two inflatable bladders to each other and to said duct.

30. A system for restricting or preventing flow of fluid through a duct, said system comprising:

at least two inflatable bladders positioned within said duct, said at least two inflatable bladders configured to engage each other upon inflation, and are coated with an adhesive to aid adhesion of said at least two inflatable bladders to each other and to said duct; and means for inflating said at least two inflatable bladders to restrict or prevent said flow of said fluid through said duct.

* * * * *